March 8, 1932.  H. L. HANSEN  1,848,781
POTATO DIGGING APPARATUS
Original Filed Dec. 28, 1928   3 Sheets-Sheet 1
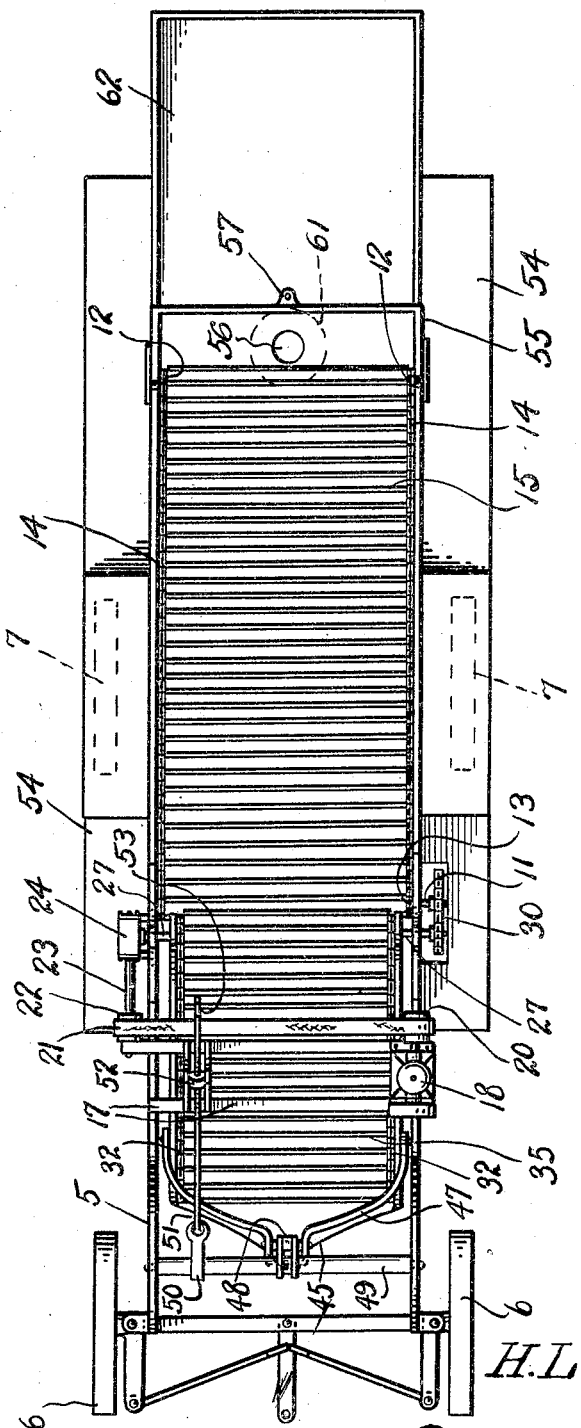
Inventor
H. L. Hansen
By Clarence A. O'Brien
Attorney March 8, 1932.  H. L. HANSEN  1,848,781
POTATO DIGGING APPARATUS
Original Filed Dec. 28, 1928  3 Sheets-Sheet 2
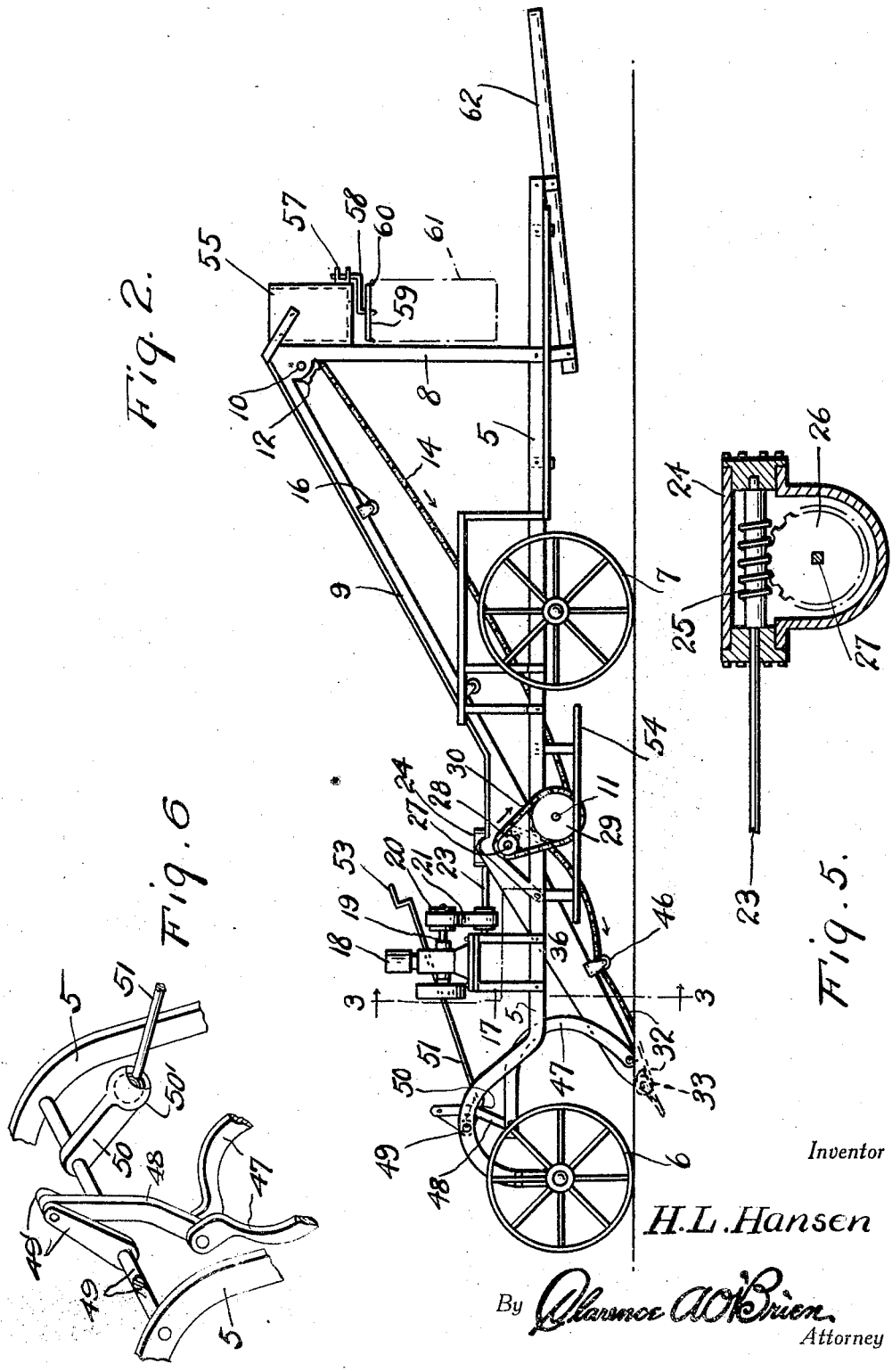
Inventor
H. L. Hansen
By Clarence A. O'Brien
Attorney

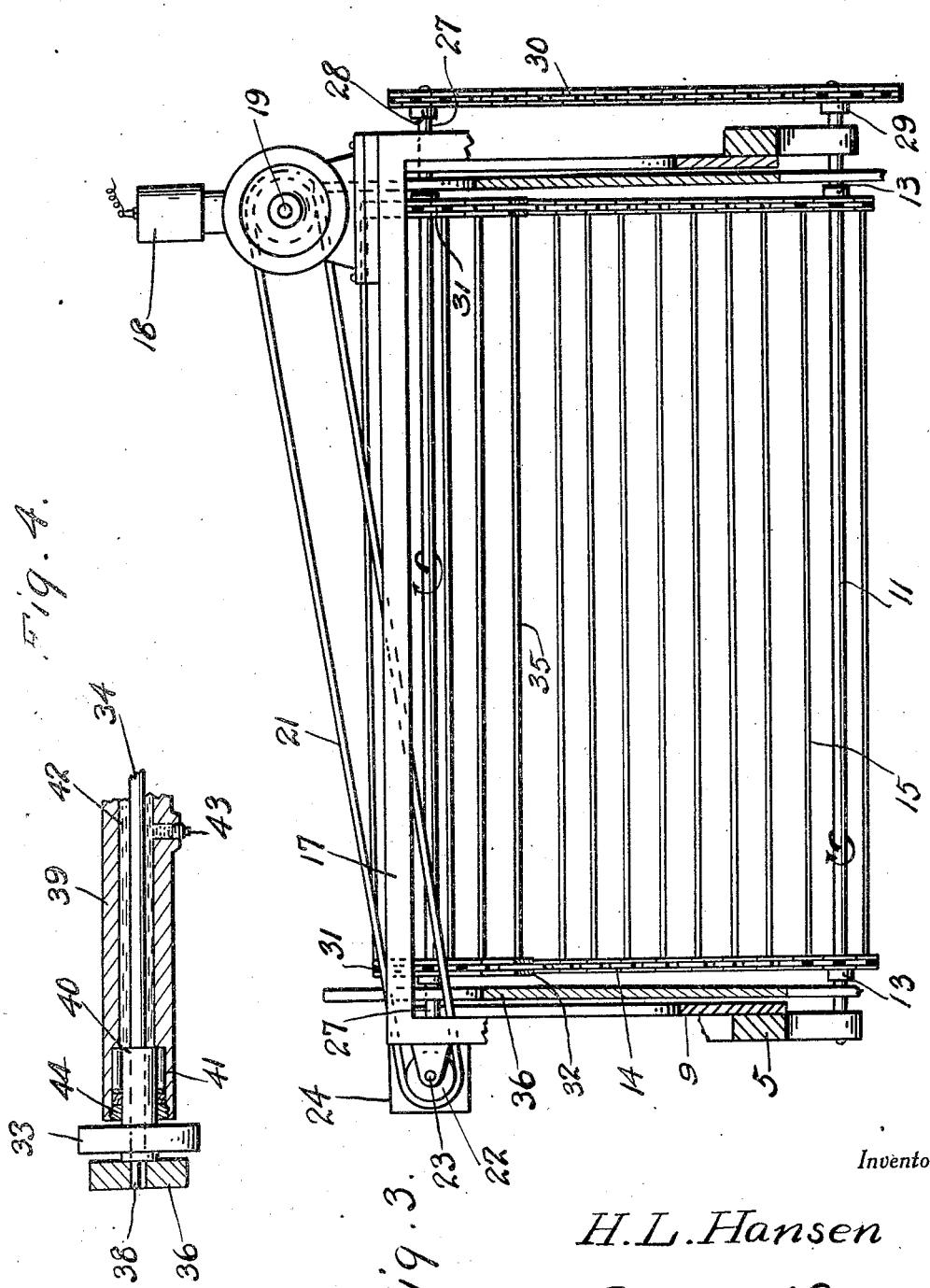

Patented Mar. 8, 1932

1,848,781

UNITED STATES PATENT OFFICE

HANS L. HANSEN, OF HEMINGFORD, NEBRASKA

POTATO DIGGING APPARATUS

Application filed December 28, 1928, Serial No. 328,891. Renewed January 28, 1932.

The present invention relates to an apparatus for digging, cleaning and sacking potatoes and has for its principal object to provide a wheeled structure having an endless conveyor associated therewith and driven by a motor carried by the apparatus for elevating the potatoes over gradings so as to loosen the dirt therefrom and also to provide platforms supported about the frame of the machine upon which workmen may stand for picking and removing foreign matter from the potatoes before the same are packed.

A further object of the invention is to provide a digging element having novel adjusting means for regulating the depth at which the same penetrates the soil.

A still further object is to provide a sacking apparatus for receiving the potatoes from the conveyor and discharging the same into sacks removably attached upon a swinging bracket arranged for movement into and out of position with respect to the sacking apparatus.
Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a top plan view of the potato digging apparatus in operative position, Figure 2 is a side elevational view thereof, Figure 3 is a vertical transverse sectional view taken substantially along a line 3—3 of Figure 2, Figure 4 is a fragmentary longitudinal sectional view of the mounting for the lower end of the conveyor carried by the digging element, Figure 5 is a fragmentary sectional view through the housing for the worm drive connection between the conveyor and elevator shaft and the motor, and Figure 6 is a fragmentary perspective view of a swivel joint.

Referring now to the drawings in detail wherein for the purpose of illustration I have disclosed a preferred embodiment of the invention, the numeral 5 designates a frame mounted upon front and rear wheels 6 and 7 respectively.

The frame 5 extends rearwardly of the rear wheels 7 and carries an elevator support composed of a pair of spaced uprights 8 connected at their upper ends with forwardly and downwardly inclined support members 9. Shafts 10 and 11 are journaled for rotation adjacent the upper and lower ends respectively of the inclined member 9. The upper inclined part 9 is of angle iron.

The shafts are provided with sprocket wheels 12 and 13 respectively mounted at each end of the shaft and are operatively connected by a pair of chains 14. A plurality of closely spaced parallel rods 15 extend transversely of the apparatus with their opposite ends attached to the respective chains 14 for movement with the chains about the shafts 10 and 11 and constitute a conveyor for the material delivered at a point adjacent the lower shaft for elevating the material and discharging the same at a point adjacent the upper shaft.

The upwardly and rearwardly inclined supporting members 9 form guides for each side of the conveyor and also mount rollers 16 along their lower edges, over which the chains 14 and rods 15 are adapted to travel to prevent sagging of the upper section of the conveyor.

A motor support or engine stand 17 is mounted upon the frame members 5, adjacent the forward portion thereof to which a motor 18 is attached, the motor preferably being in the form of an internal combustion engine.

To the drive shaft 19 of the engine is attached a pulley wheel 20 for operating a belt 21 extending about a belt pulley 22 supported at one side of the frame of the apparatus and from which pulley a shaft 23 extends rearwardly through a gear housing 24 supported at the side of one of the frame members 5.

The end of the shaft disposed within the housing is provided with a worm 25 in operative engagement with a worm gear 26 mounted in the housing, said gear being keyed to a shaft 27 extending through one side of the housing and disposed transversely of the apparatus and journaled in the frame members 5 thereof.

The shaft 27 is disposed in substantially closely spaced parallel relation with the shaft 11 of the conveyor and these shafts are each provided with sprocket wheels 28 and 29 respectively operatively connected through a chain 30. It will thus be apparent that the conveyor mounted upon the shafts 10 and 11 is operated through the engine.

The shaft 27 is also utilized to operate a forwardly disposed conveyor and for this purpose is provided adjacent its opposite ends with a pair of sprocket wheels 31 about which chains 32 are operatively arranged. The chains extend forwardly at opposite sides of the apparatus about rollers 33 mounted for free rotation adjacent the opposite ends of a stationary shaft 34.

A plurality of closely spaced parallel rods 35 extend transversely of the apparatus with their opposite ends attached to the chains 32 for movement about the shafts 27 and 34 with said chains. The opposite ends of the shaft 34 are supported in a pair of side boards 36 disposed in closely spaced parallel relation with the chains 32 and pivotally supported at their rear ends to the frame, adjacent the shaft.

The side boards 36 extend forwardly and downwardly with the shaft 34 supported adjacent the forward ends thereof, the ends of the shaft being squared as shown at 38 whereby to prevent rotation thereof.

A housing 39 is arranged about the shaft 34 with the opposite ends of the housing rotatably supported upon hubs 40 extending inwardly from the rollers 33.

A roller bearing assembly 41 is interposed between the hubs 40 and the housing whereby to facilitate the rotation of the hub and the roller. The housing is filled with a suitable quantity of lubricating oil 42 through a filler plug 43 for lubricating the hub and the roller during its rotation about the shaft.

The ends of the housing are fitted with a suitable packing 44. The forward ends of the side boards 36 have a potato digging blade 45 attached thereto and extending forwardly therefrom for penetrating the soil in advance of the conveyor rods 35 carried by the rollers 33 whereby to remove the potatoes from the ground and place the same into a position for engagement by the rods 35 of the forward conveyor.

Rollers 46 are supported at the lower edge of the side boards 36 for supporting the chains 32 and rods 35 from dragging along the ground during the digging operation.

The forward ends of the side boards 36 are supported for vertical adjustment by means of a bail 47 pivotally attached to a link 48 carried by an arm 49', on the rock shaft 49, extending transversely of the frame members 5 and journaled at its opposite ends for rotation therein.

The rock shaft is also provided with a radially extending arm 50 to which one end of a screw threaded crank rod 51 is swivelly connected, said crank rod extending rearwardly and being threaded through a pivoted guide 52 also mounted on the motor frame 17. The rear end of the screw is formed into a crank handle 53 providing operating means for the screw whereby to accomplish the vertical adjustment of the side boards 36 and the forwardly disposed conveyor.

As clearly illustrated in Figure 2 of the drawings, the adjacent ends of the conveyors are disposed in overlapping relation so that the material from the forward conveyor will be deposited upon the rear conveyor and transported toward the rear of the machine.

Platforms 54 are supported at each side of the machine upon the frame members 5 upon which workmen may stand for removing any foreign matter from the conveyors which may be picked up during the digging operation. A receptacle or hopper 55 is attached to the upright 8 in a position for receiving the potatoes from the discharge end of the rearward conveyor, the hopper having a discharge opening 56 formed in the bottom thereof.

A bracket 57 is attached to the rear wall of the hopper for pivotally supporting an angular arm 58 adapted for swinging movement into and out of position beneath the hopper. The free end of the arm is provided with an annular member 59 having hooks 60 extending therefrom upon which a potato sack indicated by the dotted lines at 61 may be attached for swinging movement with said arm.

It will be apparent from the foregoing that the sack may be swung into and out of position beneath the opening 56 of the hopper whereby to receive the potatoes discharged therefrom and when a desired quantity of the potatoes have been placed in the sack the same may be swung away from the hopper and removed from the hooks 60.

A work platform 62 extends rearwardly of the frame members 5 of the machine adapted to support a workman for removing and replacing the sacks 61 while the machine is in motion.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

A potato digger of the character described, comprising a wheeled frame, an endless conveyor rigidly mounted on the frame, a vertically adjustable endless conveyor mounted on the frame and overlapping the first named conveyor, a stand mounted on the frame and extending transversely thereover, an engine mounted on the stand operatively coupled to the conveyors and means for shifting the adjustable conveyor vertically comprising a rotatable shaft journaled in the frame, a pair of arms projecting laterally from the shaft, a bail pivotally coupled to one of said arms and to the adjustable conveyor, a screw threaded crank rod swivelly connected to the other arm and a guide mounted on the engine stand for threaded engagement with the crank rod adjacent its free end.

In testimony whereof I affix my signature.

HANS L. HANSEN.